No. 871,225. PATENTED NOV. 19, 1907.
L. W. JONES.
WATER SOFTENER.
APPLICATION FILED DEC. 3, 1906.

WITNESSES. INVENTOR.

UNITED STATES PATENT OFFICE.

LLEWELLYN W. JONES, OF SEWICKLEY, PENNSYLVANIA, ASSIGNOR TO PITTSBURGH FILTER MANUFACTURING COMPANY, OF PITTSBURG, PENNSYLVANIA, A CORPORATION OF PENNSYLVANIA.

WATER-SOFTENER.

No. 871,225.  Specification of Letters Patent.  Patented Nov. 19, 1907.

Application filed December 3, 1906. Serial No. 346,017.

*To all whom it may concern:*

Be it known that I, LLEWELLYN W. JONES, a resident of Sewickley, in the county of Allegheny and State of Pennsylvania, have invented a new and useful Improvement in Water-Softeners; and I do hereby declare the following to be a full, clear, and exact description thereof.

My invention relates to water softening apparatus, and more particularly to that style of apparatus described and claimed in a joint application filed by me and Frederick B. Leopold on the 3rd day of December, Serial No. 346,018, in which the solution and reaction chambers are inclosed within the main tank, the lime water being introduced at the lower end of the solution chamber and overflowing into a pipe arranged therein which connects with the lower end of the reaction chamber, while the water to be treated is forced up into the lower end of the reaction chamber, the combined water to be treated and the lime water overflowing from said reaction chamber into a down-take conduit in the main tank.

The object of my present invention is to combine the solution and reaction chambers in such a manner with the down-take conduit as to greatly simplify the construction as well as reduce the cost thereof.

To these ends my invention comprises the novel features hereinafter set forth and claimed.

Figure 1:
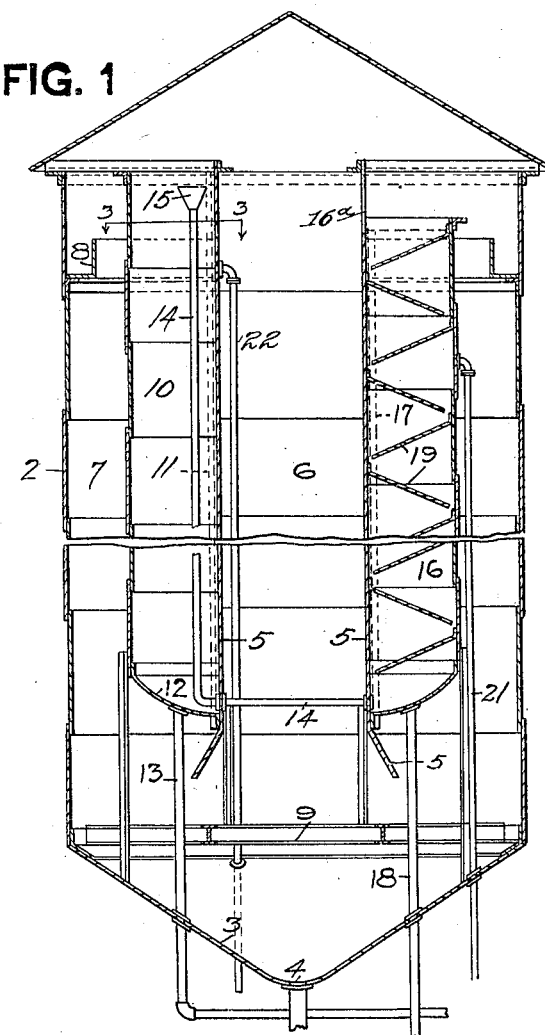
Figure 3:
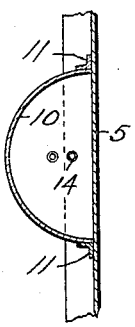
Figure 2:
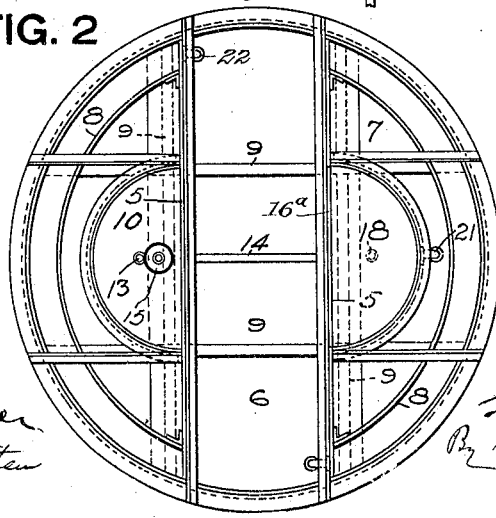

In the drawings Figure 1 is a sectional elevation of a water softening tank showing my invention as applied thereto; Fig. 2 is a plan view thereof; and Fig. 3 is a horizontal section on the line 3—3 Fig. 1.

As my invention relates to the construction of the solution and reaction chambers I have not deemed it necessary to illustrate in detail all the accompanying apparatus showing the lime and soda tanks, the pumps for forcing the lime and soda into the solution and reaction chambers, together with the motor for delivering the water to be treated to the reaction chamber, &c. Accordingly, in the drawings the numeral 2 designates a suitable tank having the sloping bottom 3 with the central opening 4 for carrying off the deposit. Within the tank 2 are the baffles 5 which form the down-take conduit 6, said conduit communicating at its lower end with the main portion of the tank 2 and the water rising in the compartment 7 of said tank. At the upper end of the tank is the overflow trough 8. The tank 2 is supported and braced internally at its lower end by means of the channel beams 9 which are secured to the inner walls of the tank 2, so as to form a structure of sufficient strength.

The solution chamber 10 is preferably semi-cylindrical or trough-shaped in form and is secured to the outer wall of one of the baffles 5, said chamber having the angle pieces 11 by means of which it is riveted to said baffle. The lower end of the reaction chamber has the sloping bottom 12 to which the pipe 13 is connected by means of which the lime water is delivered to said solution chamber. The lime water may be pumped from a suitable tank and forced through the pipe 13 into the lower end of said solution chamber. By attaching the solution chamber to the wall of the baffle 5 in this manner the wall of the baffle forms one wall of the solution chamber, and there is a great saving of material, while at the same time the arrangement is such as to leave the down-take passage 6 free for the descent of the water and lime contained therein.

Within the solution chamber 10 is the overflow pipe 14 having at its upper end the funnel 15. The lower end of the pipe 14 passes through the conduit 6 and communicates with the lower end of the reaction chamber 16. This reaction chamber 16 like the solution chamber 10 is preferably semi-cylindrical or trough-shaped in form and has the angle pieces 17 by means of which it is riveted to the outer wall of the other baffle 5. The upper portion of the baffle 5 is cut away to form the opening 16ᵃ by means of which the water may pass from the reaction chamber 16 into the down-take conduit 6. Connected to the lower end of the reaction chamber 16 is the pipe 18 by means of which the water to be treated is introduced to said reaction chamber. This pipe 18 may be connected up with the exhaust of a suitable water motor whereby the water is forced up through said pipe into the chamber 16. The chamber 16 is provided with the baffles 19 to retard the flow of the lime water and water to be treated in order that they may be throroughly mixed before they pass from the upper end of the reaction chamber and overflow into the down-take conduit. A pipe 21 may be connected up with a suitable soda tank for supplying the soda solution to the mixing or reaction chamber. A pipe 22 leads from the trough 8 and conveys the water to a suitable tank or storage reservoir.

What I claim is:

1. In water softening apparatus, the combination of a tank, baffle plates extending across said tank and forming a down-take conduit between the same, and a solution tank secured to the wall of one of said baffles.

2. In water softening apparatus, the combination of a tank, baffle plates extending across the said tank and forming a down-take conduit between the same, and a solution chamber secured to the outside wall of one of the baffles.

3. In water softening apparatus, the combination of a suitable tank, baffle plates extending across said tank and forming a down-take conduit between the same, and a trough shaped solution chamber secured to the outside wall of one of said baffle plates.

4. In water softening apparatus, the combination of a tank, baffle plates extending across said tank and forming a down-take conduit between the same, a trough shaped solution tank secured to the outside wall of one of said baffles, said baffle forming one of the walls of said solution tank.

5. In water softening apparatus, the combination of a tank, baffle plates extending across said tank and forming a down-take conduit between the same, a solution chamber, and a re-action chamber secured to one of said baffle plates.

6. In water softening apparatus, the combination of a tank, baffle plates extending across said tank and forming a down-take conduit between the same, a solution chamber, a trough shaped re-action chamber secured to one of said baffle plates, said baffle plate forming one of the walls of said re-action chamber.

7. In water softening apparatus, the combination of a tank, baffle plates extending across said tank and forming a down-take conduit between the same, solution and reaction chambers secured to the outer walls of said baffle plates.

8. In water softening apparatus, the combination of a tank, a down-take conduit therein, solution and reaction chambers secured to the outer walls of said conduit, and pipe connections extending across said conduit between the lower portion of said solution chamber and the lower portion of said reaction chamber.

In testimony whereof, I the said LLEWELLYN W. JONES have hereunto set my hand.

LLEWELLYN W. JONES.

Witnesses:
ROBERT C. TOTTEN,
ROBT. D. TOTTEN.